United States Patent
Huang (10) Patent No.: US 10,649,170 B1
(45) Date of Patent: May 12, 2020

(54) LIGHT SOURCE ASSEMBLY AND PROJECTION APPARATUS

(71) Applicant: Coretronic Corporation, Hsin-Chu (TW)

(72) Inventor: Shou-Cheng Huang, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 0 days.

(21) Appl. No.: 16/285,228

(22) Filed: Feb. 26, 2019

(51) Int. Cl.
| | | |
|---|---|---|
| G02B 7/02 | (2006.01) | |
| G03B 21/20 | (2006.01) | |
| F21V 21/30 | (2006.01) | |

(52) U.S. Cl.
CPC ............ *G02B 7/023* (2013.01); *G02B 7/021* (2013.01); *G03B 21/2013* (2013.01); *G03B 21/2033* (2013.01); *G03B 21/2046* (2013.01); *F21V 21/30* (2013.01); *G03B 21/2086* (2013.01)

(58) Field of Classification Search
CPC ............ G03B 21/2013; G03B 21/2033; G03B 21/2046; G03B 21/2086; G02B 7/021; G02B 7/023; G02B 3/0075; F21V 21/30
See application file for complete search history.

(56) References Cited

U.S. PATENT DOCUMENTS

| | | | | |
|---|---|---|---|---|
| 2012/0327377 A1* | 12/2012 | Ohsugi | ............... | G03B 21/208 353/38 |
| 2013/0038841 A1* | 2/2013 | Zakoji | ............... | G03B 21/2013 353/30 |
| 2013/0038842 A1* | 2/2013 | Zakoji | ............... | G03B 21/2013 353/30 |
| 2013/0057834 A1* | 3/2013 | Yoshida | ................... | F21V 5/04 353/38 |
| 2013/0100974 A1* | 4/2013 | Janssens | ............ | G02B 27/0961 372/35 |
| 2015/0355533 A1* | 12/2015 | Masuda | ............... | G03B 21/204 353/52 |

FOREIGN PATENT DOCUMENTS

| | | |
|---|---|---|
| CN | 206818951 | 12/2017 |
| CN | 108089276 | 5/2018 |
| TW | 201445209 | 12/2014 |

* cited by examiner

Primary Examiner — Bao-Luan Q Le
(74) Attorney, Agent, or Firm — JCIPRNET (57) ABSTRACT

A light source assembly includes a substrate, a fixing base, an adjusting frame, an adjusting plate and a lens plate. The substrate includes a plurality of light-emitting units. The fixing base is fixed onto the substrate and comprising a bottom and at least one wall, wherein a recess is formed at least by the bottom and the at least one wall. The adjusting frame is movably disposed in the recess and having an opening. The adjusting plate is movably disposed in the opening of the adjusting frame. The lens plate is fixed onto the adjusting plate and includes a plurality of lenses, wherein a plurality of first through-holes are formed in the bottom of the fixing base and a plurality of second through-holes are formed in the adjusting plate such that the plurality of light-emitting units are exposed from the adjusting plate.

25 Claims, 8 Drawing Sheets

FIG. 7 ically, to a light source
LIGHT SOURCE ASSEMBLY AND PROJECTION APPARATUS

BACKGROUND

Technical Field

The disclosure relates to a light source assembly and a projection apparatus, and in particularly, to a light source assembly and a projection apparatus having better light-emitting efficiency.

Description of Related Art

In general, a conventional light source assembly includes a light-emitting unit and a lens corresponding to the light-emitting unit. Due to tolerance in assembly, the lens may not be accurately aligned with the light-emitting unit, resulting in a compromise in the light-emitting efficiency of the light source assembly.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a light source assembly in which a lens may be advantageously adjusted such that the lens may be well aligned with a light-emitting unit.

The invention is directed to a projection apparatus employing the light source assembly mentioned above.

Other objects and advantages of the invention may be further illustrated by the technical features broadly embodied and described as follows.

In order to achieve one or a portion of or all of the objects or other objects, an embodiment of the invention provides a light source assembly including a substrate, a fixing base, an adjusting frame, an adjusting plate and a lens plate. The substrate includes a plurality of light-emitting units. The fixing base is fixed onto the substrate and comprises a bottom and at least one wall. A recess is formed at least by the bottom and the at least one wall. The adjusting frame is movably disposed in the recess and has an opening. The adjusting plate is movably disposed in the opening of the adjusting frame. The lens plate is fixed onto the adjusting plate and includes a plurality of lenses, a plurality of first through-holes are formed in the bottom of the fixing base, and a plurality of second through-holes are formed in the adjusting plate such that the plurality of light-emitting units are exposed from the adjusting plate.

In some embodiments, the at least one wall of the fixing base is connected to and substantially perpendicular to the bottom.

In some embodiments, the light source assembly may further comprise at least one first adjusting member. The at least one first adjusting member may be used to adjustably connect the adjusting frame and the fixing base, such that the adjusting frame is movable along a first direction relative to the fixing base.

In some embodiments, the light source assembly may further comprise at least one second adjusting member. The at least one second adjusting member may be used to adjustably connect the adjusting plate, the adjusting frame, and the fixing base, such that the adjusting plate is movable along a second direction relative to the fixing base.

In some embodiments, the at least one first adjusting member comprises a first screw, and a first adjusting hole is formed in the at least one wall of the fixing base. A first adjusting protrusion is formed on the adjusting frame, and one end of the first screw passes through the first adjusting hole of the fixing base and may be connected into the first adjusting protrusion of the adjusting frame.

In some embodiments, the at least one first adjusting member may further comprise a first spring disposed between the other end of the first screw and the adjusting frame.

In some embodiments, the at least one second adjusting member may comprise a second screw, and a second adjusting hole may be formed in the at least one wall of the fixing base. A medium adjusting hole may be formed in the adjusting frame, and a second adjusting protrusion may be formed on the adjusting plate. One end of the second screw may pass through the second adjusting hole of the fixing base and the medium adjusting hole of the adjusting frame. The end of the second screw is connected into the second adjusting protrusion of the adjusting plate.

In some embodiments, the at least one second adjusting member may further comprise a second spring disposed between the other end of the second screw and the adjusting plate.

In some embodiments, the first adjusting protrusion of the adjusting frame may extend along the first direction, protrude outwardly, and be threaded inside of the first adjusting protrusion.

In some embodiments, the second adjusting protrusion of the adjusting plate extends along the second direction, protrudes outwardly, and is threaded inside of the second adjusting protrusion.

In some embodiments, the first adjusting protrusion has a first portion with a first diameter and a second portion with a second diameter, and the second diameter is greater than the first diameter.

In some embodiments, the first portion is partially located in the first adjusting hole, and an inner diameter of the first adjusting hole is greater than the first diameter and less than the second diameter.

In some embodiments, the second adjusting protrusion has a third portion with a third diameter and a fourth portion with a fourth diameter, and the fourth diameter is greater than the third diameter.

In some embodiments, the third portion is partially located in the second adjusting hole, and an inner diameter of the second adjusting hole is greater than the third diameter and less than the fourth diameter.

In some embodiments, the fixing base may comprise at least one first positioning hole formed in the at least one wall, the adjusting frame comprises at least one first positioning pin protruding outwardly and extending along the first direction, and the at least one first positioning pin is located in the at least one first positioning hole.

In some embodiments, the fixing base comprises at least one second positioning hole formed in the at least one wall, the adjusting frame comprises at least one medium positioning hole, and the adjusting plate comprises at least one second positioning pin protruding outwardly and extending along the second direction. The at least one second positioning pin passes through the at least one medium positioning hole of the adjusting frame and extends into the at least one second positioning hole.

In some embodiments, the substrate comprises a plurality of bosses, the fixing base comprises a plurality of bottom through-holes formed in the bottom, and the plurality of bottom through-holes correspond to the plurality of bosses. The plurality of bosses may pass through the plurality of bottom through-holes and lift the adjusting plate.

In some embodiments, the adjusting plate has a first surface and a second surface opposite to each other, the first surface faces towards the bottom of the fixing base, and the second surface faces towards the lens plate. The adjusting plate comprises at least one first ribs located on the first surface and extending along the first direction.

In some embodiments, the at least one first ribs comprises one first rib extending across the first surface all the way in the first direction, and the at least one first ribs comprises another first rib extending across the first surface not all the way in the first direction.

In some embodiments, the adjusting plate has a first surface and a second surface opposite to each other, the first surface faces towards the bottom of the fixing base, and the second surface faces towards the lens plate. The adjusting plate comprises at least one second ribs located on the first surface and extending along the second direction.

In some embodiments, the light source assembly may further comprise an outer frame fixed onto the fixing base. The adjusting plate has a first surface and a second surface opposite to each other, the first surface faces towards the bottom of the fixing base, and the second surface faces towards the lens plate. The outer frame is located partially on the second surface of the adjusting plate such that the lens plate fixed onto the adjusting plate is uncovered.

In some embodiments, the adjusting plate comprises at least one lateral plate side perpendicular to the first direction, the adjusting frame comprises at least one lateral internal surface perpendicular to the first direction, and the at least one lateral plate side abuts against the at least one lateral internal surface.

In some embodiments, the lens plate is fixed onto the adjusting plate by using at least one plate spring.

An embodiment of the invention provides a projection apparatus. The projection apparatus includes the aforementioned light source assembly, a light engine assembly and a projection lens assembly. The light source assembly provides an illumination beam. The light engine assembly is provided for converting the illumination beam into an image beam. The projection lens assembly is provided for projecting the image beam onto a projection object.

Based on the above description, the embodiments of the invention may achieve at least one of following advantages or effects. In one embodiment of the invention, the adjusting frame of the light source assembly is movably disposed in the recess of the fixing base, the adjusting plate is movably disposed in the opening of the adjusting frame, such that the lenses of the lens plate fixed onto the adjusting plate is adapted to move relative to the adjusting frame and the fixing base. Therefore, the lenses are adapted to be adjusted so as to be aligned with the light-emitting units of the substrate which is fixed to the fixing base, so that the light source assembly may provide better light-emitting efficiency.

To provide a further understanding of the aforementioned and other features and advantages of the invention, exemplary embodiments, together with the reference drawings, are described in detail below.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
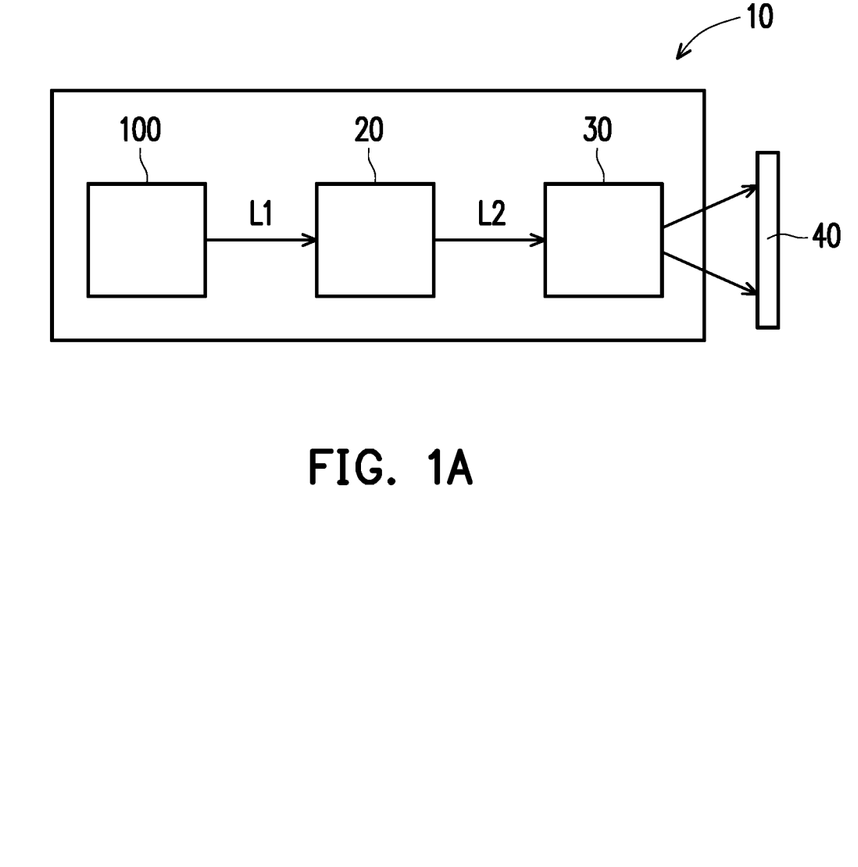
FIG. 1A is a schematic block diagram of a projection apparatus according to one embodiment of the invention.

FIG. 1A is a schematic block diagram of a projection apparatus according to one embodiment of the invention. Referring to FIG. 1, a projection apparatus 10 includes a light source assembly 100, a light engine assembly 20 and a projection lens assembly 30. The light source assembly 100 provides an illumination beam L. The light engine assembly 20 is located at a path of the illumination beam L1 and is provided for converting the illumination beam L1 into an image beam L2. In one embodiment, the light engine assembly 20 may include a plurality of lenses and a light valve. For example, the light valve may include a Digital Micro-mirror Device (DMD), a Liquid-Crystal-On-Silicon (LCOS) panel, a transmissive liquid crystal panel or other beam modulator. The type of the light engine assembly 20 may not be limited to the present disclosure. The projection lens assembly 30 is located at a path of the image beam L2 and is provided for projecting the image beam L2 onto a projection object 40. In one embodiment, the projection assembly 30 may include at least one lens, such as a plano-convex lens or a biconcave lens, and may enlarge a combined full-color light from a light engine assembly 20, such that an image is formed on the projection object 40. In one embodiment, the projection object 40 may be a screen, a wall, or other objects suitable for showing an image.

Figure 1B:
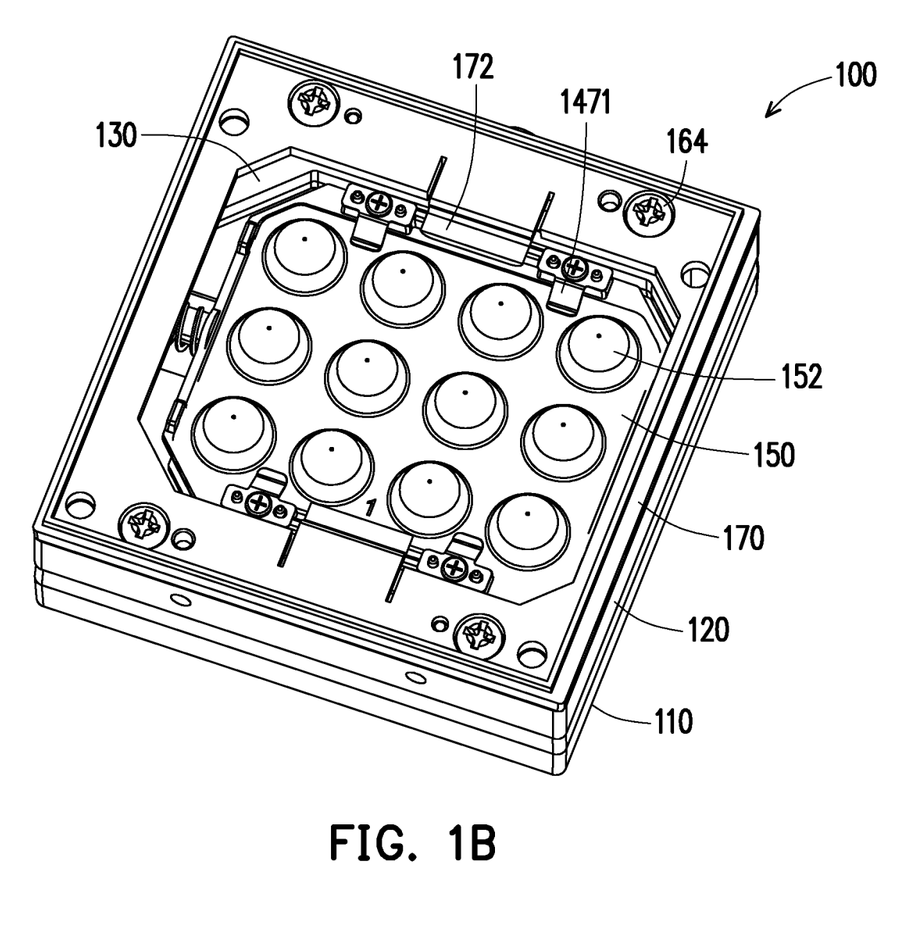
FIG. 1B illustrates a schematic diagram of a light source assembly employed in the projection apparatus of FIG. 1.
Figure 2:
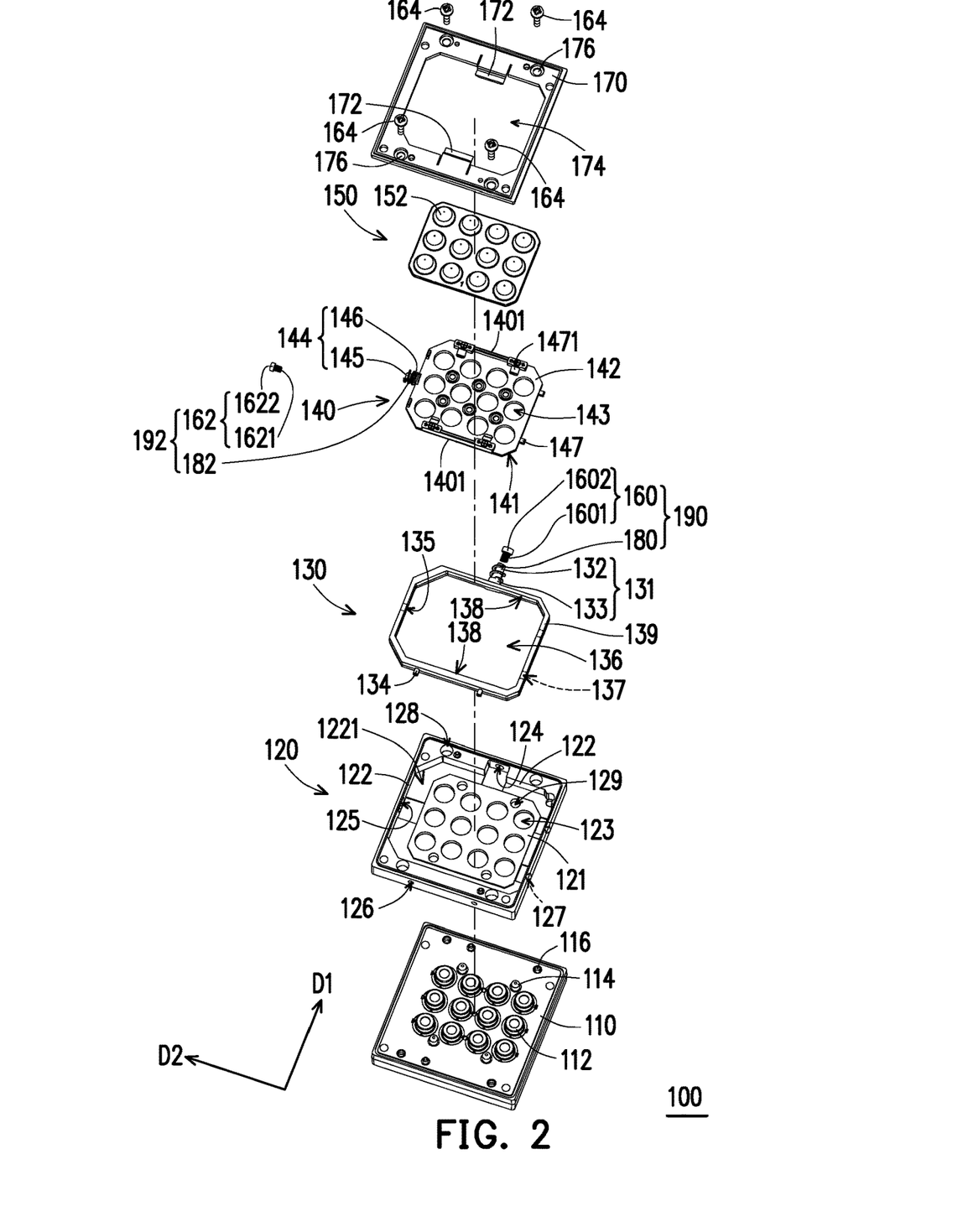
FIG. 2 illustrates an exploded schematic diagram of the light source assembly of FIG. 1B.

In the embodiment, the light source assembly 100 is capable of providing better light-emitting efficiency and details of the light source assembly 100 may be described below. FIG. 1B illustrates a schematic diagram of a light source assembly employed in the projection apparatus of FIG. 1. FIG. 2 illustrates an exploded schematic diagram of the light source assembly of FIG. 1B. FIGS. 3-6 illustrate schematic diagrams of an assembling process of the light source assembly of FIG. 1B.

Figure 3:
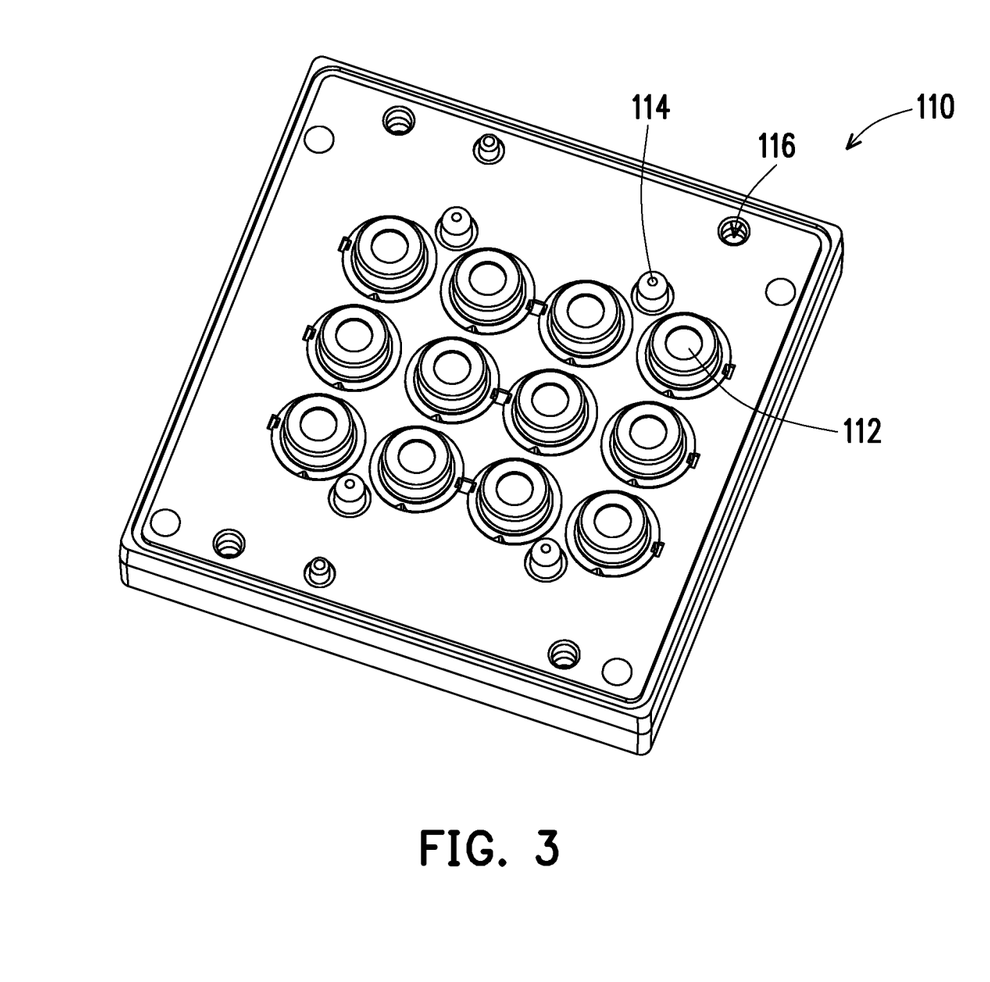
FIGS. 3-6 illustrate schematic diagrams of an assembling process of the light source assembly of FIG. 1B.

Referring to FIG. 1B to FIG. 6, in an embodiment, the light source assembly 100 includes a substrate 110, a fixing base 120, an adjusting frame 130, an adjusting plate 140 (FIG. 2) and a lens plate 150. As shown in FIGS. 2 and 3, the substrate 110 includes a plurality of light-emitting units 112. In the embodiment, the light-emitting units 112 are red laser light units, and the illumination beam L1 is a red laser beam, i.e. a beam with a red waveband. The light-emitting units 112, for example, include a plurality of red laser diodes arranged in an array, though the invention is not limited thereto. In other embodiment, the light-emitting units 112 may be laser light units of other colors, such as laser light units of blue. In yet another embodiment, the light-emitting units 112 may be LEDs.

Figure 4:
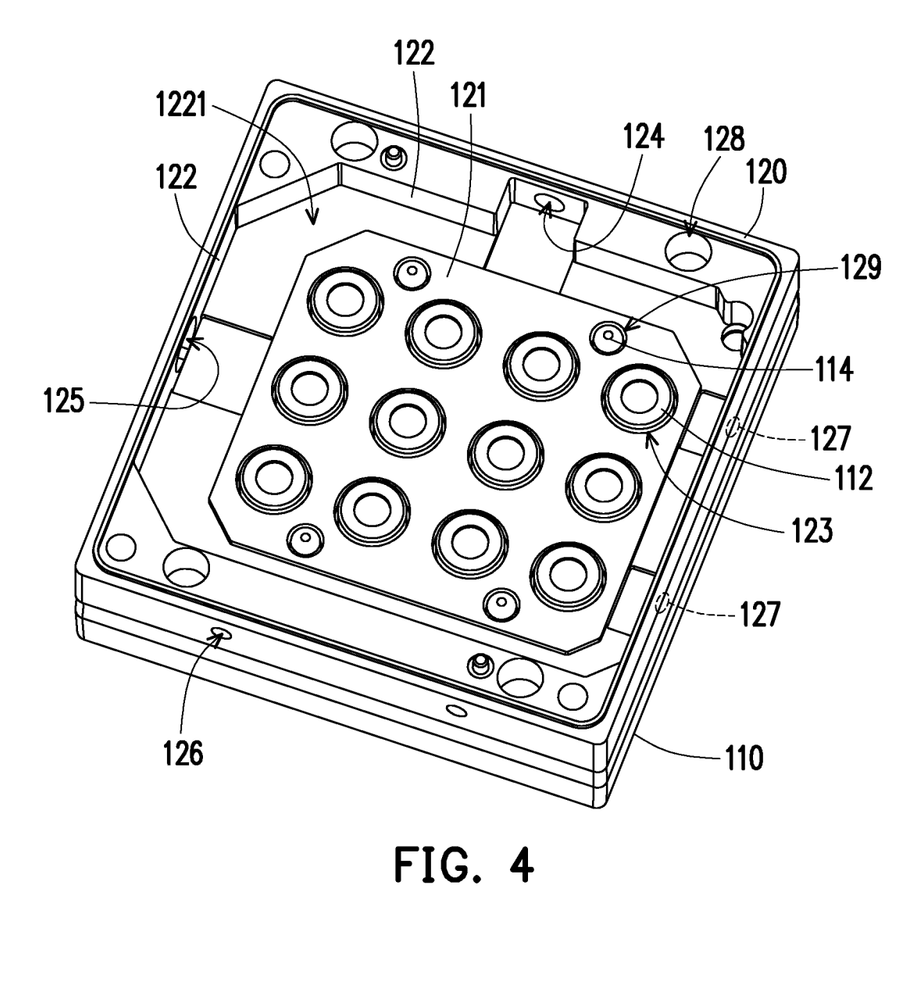

Referring to FIGS. 2 and 4, the fixing base 120 is fixed onto the substrate 110 and includes a bottom 121 and at least one wall 122. In the embodiment, the at least one wall 122 of the fixing base 120 is connected to and substantially perpendicular to the bottom 121. A recess 1221 is formed at least by the bottom 121 and the at least one wall 122. In the embodiment, the fixing base 120 includes eight wall 122s connected to the bottom 121, however number of the at least one wall 122 is not limited thereto.

Figure 5:
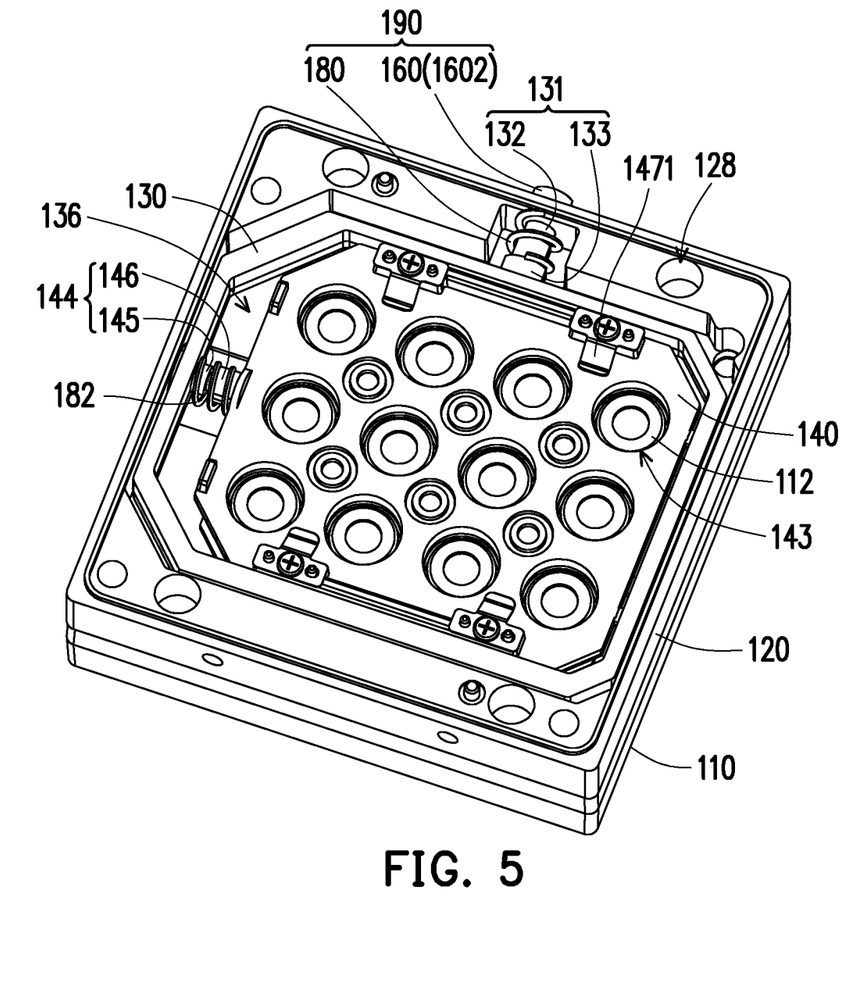

Referring to FIGS. 2 and 5, the adjusting frame 130 is movably disposed in the recess 1221 (FIG. 2) and has an opening 136. The adjusting plate 140 is movably disposed in the opening 136 of the adjusting frame 130. The adjusting plate 140 has a first surface 141 and a second surface 142 opposite to each other, the first surface 141 faces towards the bottom 121 of the fixing base 120, and the second surface 142 faces towards the lens plate 150. As shown in FIG. 2, a plurality of first through-holes 123 are formed in the bottom 121 of the fixing base 120 and a plurality of second through-holes 143 are formed in the adjusting plate 140 such that the plurality of light-emitting units 112 are exposed from the adjusting plate 140.

Figure 6:
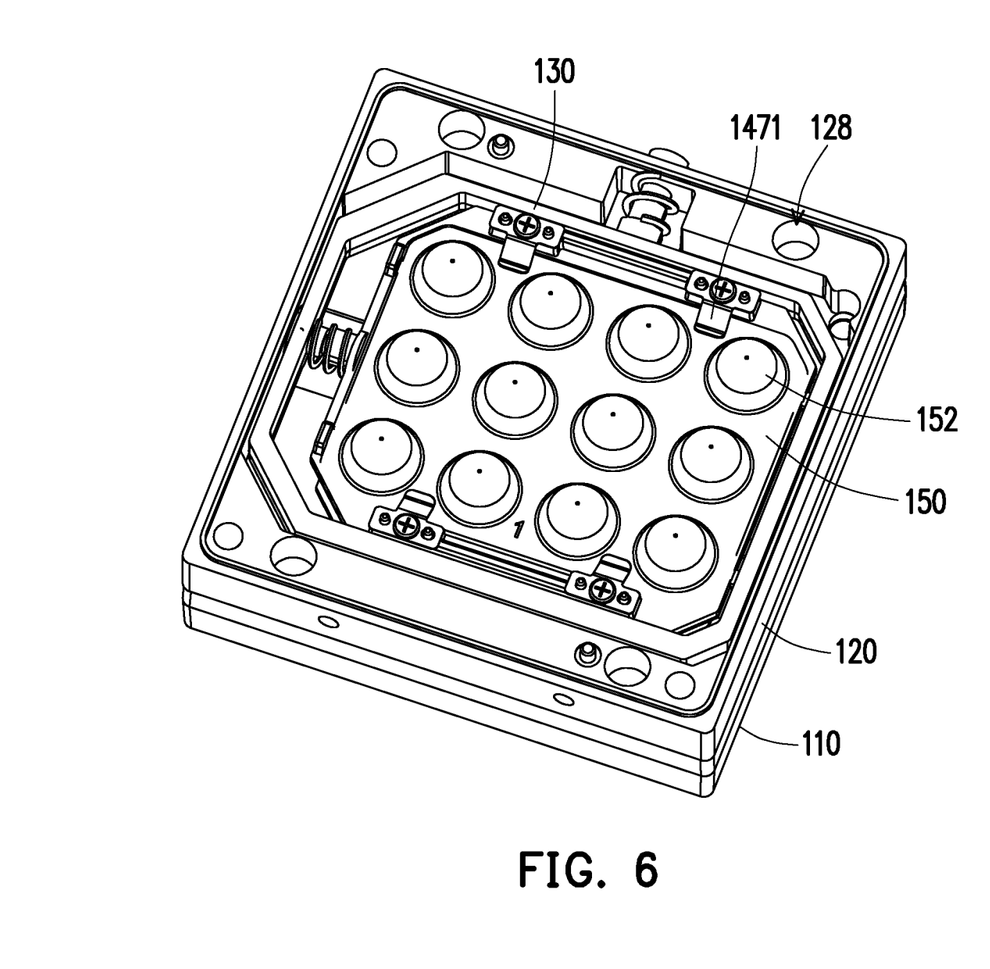

Referring to FIGS. 2 and 6, the lens plate 150 is fixed onto the adjusting plate 140 and includes a plurality of lenses 152. The lenses 152 are aligned with the second through-holes 143 of the adjusting plate 140, and are arranged as an array. In the embodiment, the lens plate 150 is fixed onto the adjusting plate 140 by using at least one plate spring 1471, but it isn't limited thereto.

In an embodiment of the light source assembly 100, the adjusting frame 130 is movably disposed in the recess 1221 of the fixing base 120, the adjusting plate 140 is movably disposed in the opening 136 of the adjusting frame 130, such that the lenses 152 of the lens plate 150 fixed onto the adjusting plate 140 is adapted to move relative to the adjusting frame 130 and the fixing base 120. Therefore, the lenses 152 may be adjusted to be aligned with the light-emitting units 112 of the substrate 110 on which the fixing base 120 is fixed. As such, the light source assembly 100 provides better light-emitting efficiency.

More specific, as shown in FIG. 2, the fixing base 120 includes at least one first positioning hole 126 formed in the at least one wall 122, the adjusting frame 130 includes at least one first positioning pin 134 protruding outwardly and extending along the first direction D1. When the adjusting frame 130 is disposed in the recess 1221 of the fixing base, the at least one first positioning pin 134 is located in the at least one first positioning hole 126, and the at least one first positioning hole 126 may guide the at least one first positioning pin 134 to move along the first direction D1. In the embodiment, the fixing base 120 includes two first positioning holes 126s on one side, and the adjusting frame 130 includes two first positioning pin 134s on one side. Numbers of the first positioning hole 126 and numbers of the first positioning pin 134s are not limited thereto. In some embodiments, the at least one first positioning hole 127 may not be through-holes. In some embodiments, term "outward" may be referred to the direction from inside of an element to outside of the element, such as the direction from the center of the adjusting frame 130 to the outside of the adjusting frame 130. However, the invention is not such limited.

In addition, as shown in FIGS. 2 and 5, in the embodiment, the light source assembly 100 further includes at least one first adjusting member 190. The at least one first adjusting member 190 is used to adjustably connect the adjusting frame 130 and the fixing base 120, such that the adjusting frame 130 is able to move to a specific position along a first direction D1 relative to the fixing base 120. Specifically, the at least one first adjusting member 190 includes a first screw 160. A first adjusting hole 124 is formed in the at least one wall 122 of the fixing base 120, and a first adjusting protrusion 131 is formed on a frame body 139 of the adjusting frame 130. One end (a male thread portion 1601) of the first screw 160 passes through the first adjusting hole 124 of the fixing base 120 and is connected into the first adjusting protrusion 131 of the adjusting frame 130.

In the embodiment, the first adjusting protrusion 131 of the adjusting frame 130 extends along the first direction D1, protrudes outwardly, and is threaded therein. The end (the male thread portion 1601) of the first screw 160 is screwed to the first adjusting protrusion 131. A position of the adjusting frame 130 relative to the fixing base 120 is adapted to be adjusted by adjusting a relative position of the first screw 160 relative to the first adjusting protrusion 131.

In addition, the first adjusting protrusion 131 has a first portion 132 with a first diameter and a second portion 133 with a second diameter, and the second diameter is greater than the first diameter. When the adjusting frame 130 is disposed in the recess 1221 of the fixing base, the first portion 132 is partially located in the first adjusting hole 124. An inner diameter of the first adjusting hole 124 is greater than the first diameter and less than the second diameter, such that the second portion 133 may not enter the first adjusting hole 124. The adjusting frame 130 is capable of moving relative to the fixing base 120 along the first direction D1 until the second portion 133 contacts the wall 122 of the fixing base 120. Therefore, the second portion 133 may be regarded as a stopper. When the second portion 130 contacts the wall 122, the second portion 130 may be used to stop the movement of the adjusting frame 130 along the first direction D1 relative to the fixing base 120, such that the moving range of the adjusting frame 130 relative to the fixing base 120 along the first direction D1 is limited.

In the embodiment, when the adjusting frame 130 is disposed in the recess 1221 of the fixing base, a screw nut 1602 of the first screw 160 is located out of the wall 122 of the fixing base 120, and the male thread portion 1601 of the first screw 160 may pass through the first adjusting hole 124 of the fixing base 120 and be screwed into the first portion 132 of the first adjusting protrusion 131. In this embodiment, when the adjusting frame 130 is disposed in the recess 1221 of the fixing base 120, the first portion 132 of the first adjusting protrusion 131 is partially located in the first adjusting hole 124 of the fixing base 120.

Moreover, the at least one first adjusting member 190 further includes a first spring 180 disposed between the other end (the screw nut 1602) of the first screw 160 and the adjusting frame 130. Specifically, the first spring 180 is sleeved onto the first portion 132 of the first adjusting protrusion 131 and located between the wall 122 and of the adjusting frame 130. As the first screw 160 is screwed forward into the first adjusting protrusion 131 of the adjusting frame 130, the adjusting frame 130 may be pulled along the first direction D1 toward the first screw 160 located outside the wall 122 of the fixing base 120, and the first spring 180 may be compressed. As such, the first spring 180 may be deformed and an elastic potential energy is stored by the deformed first spring 180. When the first screw 160 is screwed out of the first adjusting protrusion 131 of the adjusting frame 130, the first spring 180 may be decompressed and the elastic potential energy of the compressed first spring 180 is released. As a result, by using the first spring 180, the adjusting frame 130 may be pushed along the first direction D1 to an original position in the recess 1221 of the fixing base 120.

In some embodiments, the adjusting plate 140 includes at least one lateral plate side 1401 perpendicular to the first direction D1, the adjusting frame 130 includes at least one lateral internal surface 138 perpendicular to the first direction D1. When the adjusting plate 140 is disposed in the opening 136 of the adjusting frame 130, the at least one lateral plate side 1401 of the adjusting plate 140 abuts against the at least one lateral internal surface 138 of the adjusting frame 130. Therefore, the adjusting plate 140 and the lens plate 150 fixed thereon may be moved together with the adjusting frame 130 along the first direction D1.

In some embodiments, the adjusting plate 140 may include two lateral plate side 1401s perpendicular to the first direction D1, the adjusting frame 130 may include two lateral internal surface 138s perpendicular to the first direction D1. Certainly, numbers of the lateral plate side 1401 and the lateral internal surface 138 perpendicular to the first direction D1 are not limited thereto.

In some embodiments, the fixing base 120 includes at least one second positioning hole 127 formed in the at least one wall 122, the adjusting frame 130 includes at least one medium positioning hole 137, and the adjusting plate 140 includes at least one second positioning pin 147 protruding outwardly and extending along the second direction D2. When the adjusting plate 140 is disposed in the opening 136 of the adjusting frame 130 and the adjusting frame 130 is disposed in the recess 1221 of the fixing base 120, the at least one second positioning pin 147 passes through the at least one medium positioning hole 137 of the adjusting frame 130 and extends into the at least one second positioning hole 127. The at least one second positioning hole 127 and the at least one medium positioning hole 137 may be used to guide the at least one second positioning pin 147 of the adjusting plate 140, such that the adjusting plate 140 may be moved along the second direction D2. In some embodiments, the at least one second positioning hole 127 may not be through-holes.

In some embodiments, the light source assembly 100 further includes at least one second adjusting member 192 used to adjustably connect the adjusting plate 140, the adjusting frame 130, and the fixing base 120, such that the adjusting plate 140 is movable along a second direction D2 relative to the fixing base 120. Specifically, the at least one second adjusting member 192 includes a second screw 162. A second adjusting hole 125 is formed in the at least one wall 122 of the fixing base 120, a medium adjusting hole 135 is formed in the adjusting frame 130, and a second adjusting protrusion 144 is formed on the adjusting plate 140. An end (a male thread portion 1621) of the second screw 162 passes through the second adjusting hole 125 of the fixing base 120 and the medium adjusting hole 135 of the adjusting frame 130, such that the end (the male thread portion 1621) of the second screw 162 may be connected into the second adjusting protrusion 144 of the adjusting plate 140.

In the embodiment, the second adjusting protrusion 144 of the adjusting plate 140 extends along the second direction D2, protrudes outwardly, and is threaded therein. The second adjusting protrusion 144 has a third portion 145 with a third diameter and a fourth portion 146 with a fourth diameter, and the fourth diameter is greater than the third diameter. When the adjusting plate 140 is disposed in the opening 136 of the adjusting frame 130 and the adjusting frame 130 is disposed in the recess 1221 of the fixing base 120, the third portion 145 is partially located in the second adjusting hole 125 of the fixing base 120. In the embodiment, an inner diameter of the second adjusting hole 125 is greater than the third diameter and less than the fourth diameter, and an inner diameter of the medium adjusting hole 135 is greater than the third diameter and less than the fourth diameter. When the adjusting plate 140 is disposed in the opening 136 of the adjusting frame 130 and the adjusting frame 130 is disposed in the recess 1221 of the fixing base 120, the third portion 145 of the second adjusting protrusion 144 passes through the medium adjusting hole 135 of the adjusting frame 130 and the second adjusting hole 125 of the fixing base 120.

Similarly, the adjusting plate 140 can be moved relative to the adjusting frame 130 along the second direction D2 until the fourth portion 146 of the second adjusting protrusion 144 contacts the frame body 139 of the adjusting frame 130. Therefore, the fourth portion 146 may be regarded as a stopper. When the fourth portion 146 contacts the frame body 139 of the adjusting frame 130, the fourth portion 146 may be used to stop the movement of the adjusting plate 140 along the second direction D2 relative to the adjusting frame 130, such that the moving range of the adjusting plate 140 relative to the adjusting frame 130 along the second direction D2 is limited.

Moreover, the at least one second adjusting member 192 further includes a second spring 182 disposed between the other end (the screw nut 1622) of the second screw 162 and the adjusting plate 140. More specifically, the second spring 182 is sleeved onto the second adjusting protrusion 144 and located between a main part of the adjusting plate 140 and the frame body 139 of the adjusting frame 130. Similarly, as the second screw 162 is screwed forward into the second adjusting protrusion 144 of the adjusting plate 140, the adjusting plate 140 may be pulled along the second direction D2 toward the second screw 162 located outside the wall 122 of the fixing base 120, and the second spring 182 may be compressed. As such, the second spring 182 may be deformed and an elastic potential energy is stored by the deformed second spring 182. When the second screw 162 is screwed out of the second adjusting protrusion 144 of the adjusting plate 140, the second spring 182 may be decompressed and the elastic potential energy of the compressed second spring 182 is released. As a result, by using second spring 182, the adjusting plate 140 may be pushed along the second direction D2 to an original position in the opening 136 of the adjusting frame 130. Referring to FIG. 2, in the embodiment, the substrate 110 includes a plurality of bosses 114, the fixing base 120 includes a plurality of bottom through-holes 129 formed in the bottom 121, and the plurality of bottom through-holes 129 correspond to the plurality of bosses 114. When the fixing base 120 is fixed onto the substrate 110, the plurality of bosses 114 pass through the plurality of bottom through-holes 129. Since the heights of the plurality of bosses 114 may be greater than the thickness of the bottom 121 of the fixing base 120, i.e., the heights of these bosses 114 may be greater than the depths of these bottom through-holes 129, the bosses 114 may lift the adjusting plate 140 which may be assembled afterward. As such, a gap may be formed between the adjusting plate 140 and (the bottom 121 of) the fixing base 120, and a vertical dimension of the gap may be defined by the bosses 114 of the substrate 110. Specifically, the vertical dimension of the gap may be defined by the difference between the height of each boss 114 and the depth of each bottom through-hole 129.

As shown in FIGS. 1B and 2, in the embodiment, the light source assembly 100 further includes an outer frame 170. The outer frame 170 may be fixed onto the fixing base 120 and has a front opening 174. When the substrate 110, the fixing base 120, the adjusting frame 130, the adjusting plate 140 with lens plate 150, and the outer frame 170 are assembled sequentially, the outer frame 170 may be located partially on the second surface 142 of the adjusting plate 140 such that the lens plate 150 fixed onto the adjusting plate 140 is uncovered from the front opening 174 of the outer frame 170. Specifically, in an embodiment, the outer frame 170 may include at least one pressing portion 172 located along the periphery of the front opening 174 and extending inwards, and the at least one pressing portion 172 of the outer frame 170 may be located on the second surface 142 of the adjusting plate 140 and press the adjusting plate 140. In an embodiment, a plurality of screws 164 pass through a plurality of holes 176 of the outer frame 170, a plurality of holes 128 of the fixing base 120 and fixed into a plurality of screw holes 116 of the substrate 110. As such, the outer frame 170, the fixing base 120, and the substrate 110 are assembled together by using the plurality of screws 164, such that the at least one pressing portion 172 of the outer frame 170 may press against the second surface 142 of the adjusting plate 140. In such a configuration, by using the at least one pressing portion 172 of the outer frame 170, a distance in a vertical direction between the adjusting plate 140 and the substrate 110 may be maintained. As a result, a distance in the vertical direction between lenses 152 of the lens plate 150 (fixed onto the adjusting plate 140) and the lightening units 112 (of the substrate 110) may also be maintained. In the embodiment, the position of the outer frame 170 relative to the fixing base 120 and the position of the fixing base 120 relative to the substrate 110 may be maintained. For example, the vertical direction may be perpendicular to both the first direction D1 and the second direction D2.

It should be noted that in the light source assembly 100, the moving range of the adjusting frame 130 relative to the fixing base 120 along the first direction D1 is limited by the second portion 133 of the first adjusting protrusion 131, and the moving range of the adjusting plate 140 relative to the adjusting frame 130 and the fixing base 120 along the second direction D2 is limited by the fourth portion 146 of the second adjusting protrusion 144. However, structures for limiting the moving ranges of the adjusting frame 130 and the adjusting plate 140 are not limited thereto.

Figure 7:
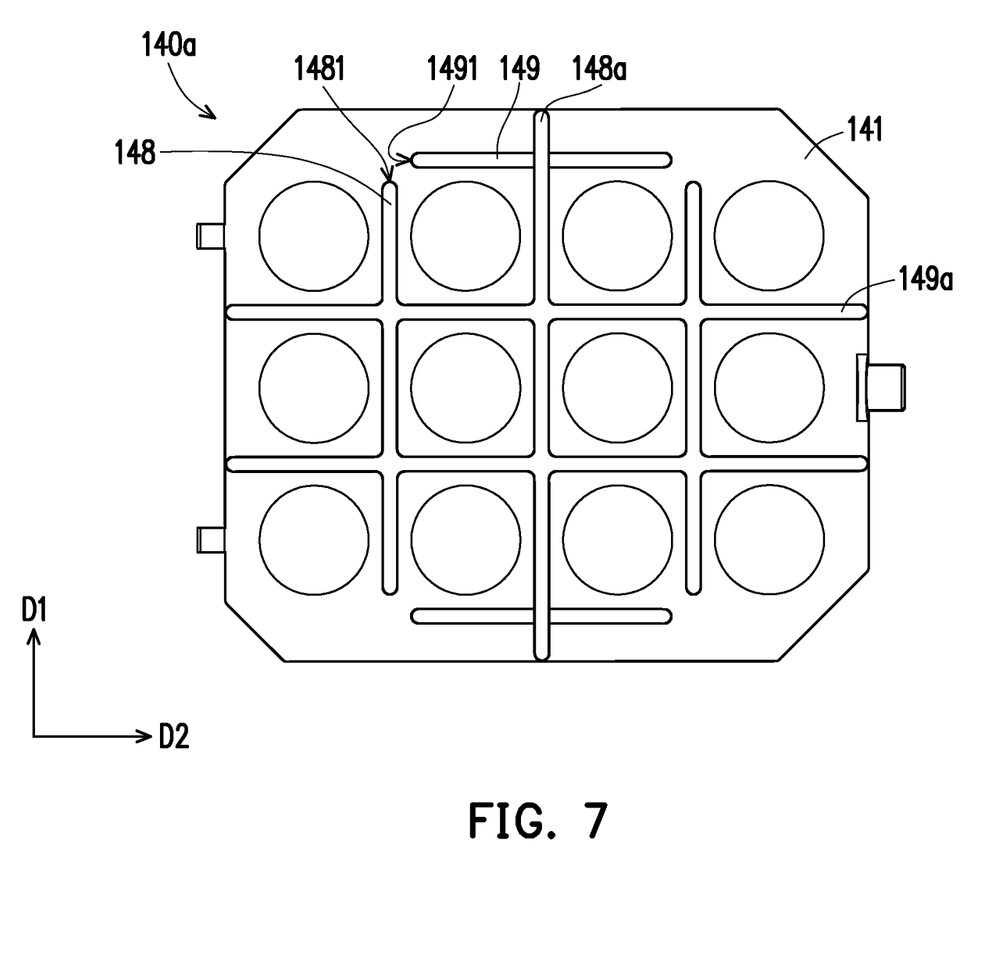
FIG. 7 illustrates a schematic diagram of an adjusting plate of a light source assembly according to another embodiment of the invention.

FIG. 7 illustrates a schematic diagram of an adjusting plate of a light source assembly according to another embodiment of the invention. Referring to FIG. 7, a main difference between the adjusting plate 140a of FIG. 7 and the adjusting plate 140 of FIG. 2 is that, in the embodiment, the adjusting plate 140a includes at least one first ribs 148, 148a located on the first surface 141 and extending along the first direction D1. Specifically, the at least one first ribs 148, 148a includes a first rib 148a extending across the first surface 141 all the way along the first direction D1 and two first ribs 148 extending across the first surface 141 not all the way along the first direction D1. In one embodiment, the first rib 148 has a first stopping surface 1481 at one end. When the adjusting plate 140a is moved in the opening 136 of the adjusting frame 130 and on the bottom 121 of the fixing base 120, the first stopping surface 1481 at one end of the first rib 148 may contact one of the plurality of bosses 114 (illustrated in FIG. 2) and the adjusting plate 140a may be stopped from further moving in the first direction D1 relative to the fixing base 120. As such, a moving range of the adjusting plate 140 in the first direction D1 is limited by the plurality of bosses 114 of the substrate 110 which pass through the bottom through-holes 129 (illustrated in FIG. 2) of the fixing base 120. As a result, the moving range of the adjusting plate 140a relative to the substrate 110 along the first direction D1 is limited.

In addition, the adjusting plate 140a further includes at least one second ribs 149, 149a located on the first surface 141 and extending along the second direction D2. Specifically, the at least one second ribs 149, 149a includes two second ribs 149a extending across the first surface 141 all the way in the second direction D2 and two second ribs 149 extending across the first surface 141 not all the way in the second direction D2. In one embodiment, the second rib 149 has a second stopping surface 1491 at one end. When the adjusting plate 140a is moved in the opening 136 of the adjusting frame 130 and on the bottom 121 of the fixing base 120, the second stopping surface 1491 at one end of the second rib 149 may contact one of the plurality of bosses 114 (illustrated in FIG. 2) and the adjusting plate 140a may be stopped from further moving in the second direction D2 relative to the fixing base 120. As such, a moving range of the adjusting plate 140 in the second direction D2 is limited by the plurality of bosses 114 of the substrate 110 which pass through the bottom through-holes 129 (illustrated in FIG. 2) of the fixing base 120. As a result, the moving range of the adjusting plate 140a relative to the substrate 110 along the second direction D2 is limited.

Based on the above description, the adjusting frame of the light source assembly is movably disposed in the recess of the fixing base, and the adjusting plate is movably disposed in the opening of the adjusting frame, such that the lenses of the lens plate fixed onto the adjusting plate is adapted to move relative to the adjusting frame and the fixing base. Since the fixing base is fixed onto the substrate, the lenses of the lens plate may be adjusted so as to be aligned with the light-emitting units of the substrate. In such a configuration, the light source assembly may provide better light-emitting efficiency.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light source assembly, comprising:
    a substrate, comprising a plurality of light-emitting units;
    a fixing base, fixed onto the substrate and comprising a bottom and at least one wall, wherein a recess is formed at least by the bottom and the at least one wall;
    an adjusting frame, movably disposed in the recess and having an opening;
    an adjusting plate, movably disposed in the opening of the adjusting frame; and
    a lens plate, fixed onto the adjusting plate and comprising a plurality of lenses, wherein a plurality of first through-holes are formed in the bottom of the fixing base and a plurality of second through-holes are formed in the adjusting plate such that the plurality of light-emitting units are exposed from the adjusting plate.

2. The light source assembly of claim 1, wherein the at least one wall of the fixing base is connected to and substantially perpendicular to the bottom.

3. The light source assembly of claim 1, further comprising at least one first adjusting member used to adjustably connect the adjusting frame and the fixing base, such that the adjusting frame is movable along a first direction relative to the fixing base.

4. The light source assembly of claim 3, further comprising at least one second adjusting member used to adjustably connect the adjusting plate, the adjusting frame, and the fixing base, such that the adjusting plate is movable along a second direction relative to the fixing base.

5. The light source assembly of claim 3, wherein the at least one first adjusting member comprises a first screw, wherein a first adjusting hole is formed in the at least one wall of the fixing base, and a first adjusting protrusion is formed on the adjusting frame, and wherein one end of the first screw passes through the first adjusting hole of the fixing base and is connected into the first adjusting protrusion of the adjusting frame.

6. The light source assembly of claim 5, wherein the at least one first adjusting member further comprises a first spring disposed between the other end of the first screw and the adjusting frame.

7. The light source assembly of claim 4, wherein the at least one second adjusting member comprises a second screw, wherein an second adjusting hole is formed in the at least one wall of the fixing base, a medium adjusting hole is formed in the adjusting frame, and a second adjusting protrusion is formed on the adjusting plate, and wherein one end of the second screw passes through the second adjusting hole of the fixing base and the medium adjusting hole of the adjusting frame, and the end of the second screw is connected into the second adjusting protrusion of the adjusting plate.

8. The light source assembly of claim 7, wherein the at least one second adjusting member further comprises a second spring disposed between the other end of the second screw and the adjusting plate.

9. The light source assembly of claim 5, wherein the first adjusting protrusion of the adjusting frame extends along the first direction, protrudes outwardly, and is threaded inside the first adjusting protrusion.

10. The light source assembly of claim 7, wherein the second adjusting protrusion of the adjusting plate extends along the second direction, protrudes outwardly, and is threaded inside the second adjusting protrusion.

11. The light source assembly of claim 5, wherein the first adjusting protrusion has a first portion with a first diameter and a second portion with a second diameter, and the second diameter is greater than the first diameter.

12. The light source assembly of claim 11, wherein the first portion is partially located in the first adjusting hole, and an inner diameter of the first adjusting hole is greater than the first diameter and less than the second diameter.

13. The light source assembly of claim 7, wherein the second adjusting protrusion has a third portion with a third diameter and a fourth portion with a fourth diameter, and the fourth diameter is greater than the third diameter.

14. The light source assembly of claim 13, the third portion is partially located in the second adjusting hole, and an inner diameter of the second adjusting hole is greater than the third diameter and less than the fourth diameter.

15. The light source assembly of claim 1, wherein the fixing base comprises at least one first positioning hole formed in the at least one wall, the adjusting frame comprises at least one first positioning pin protruding outwardly and extending along the first direction, and the at least one first positioning pin is located in the at least one first positioning hole.

16. The light source assembly of claim 1, wherein the fixing base comprises at least one second positioning hole formed in the at least one wall, the adjusting frame comprises at least one medium positioning hole, and the adjusting plate comprises at least one second positioning pin protruding outwardly and extending along the second direction, and wherein the at least one second positioning pin passes through the at least one medium positioning hole of the adjusting frame and extends into the at least one second positioning hole.

17. The light source assembly of claim 1, wherein the substrate comprises a plurality of bosses, the fixing base comprises a plurality of bottom through-holes formed in the bottom, and the plurality of bottom through-holes correspond to the plurality of bosses, and wherein the plurality of bosses pass through the plurality of bottom through-holes and lift the adjusting plate.

18. The light source assembly of claim 17, wherein the adjusting plate has a first surface and a second surface opposite to each other, the first surface faces towards the bottom of the fixing base, and the second surface faces towards the lens plate, and wherein the adjusting plate comprises at least one first ribs located on the first surface and extending along the first direction.

19. The light source assembly of claim 18, wherein the at least one first ribs comprises one first rib extending across the first surface all the way in the first direction, and wherein the at least one first ribs comprises another first rib extending across the first surface not all the way in the first direction.

20. The light source assembly of claim 17, wherein the adjusting plate has a first surface and a second surface opposite to each other, the first surface faces towards the bottom of the fixing base, and the second surface faces towards the lens plate, and wherein the adjusting plate comprises at least one second ribs located on the first surface and extending along the second direction.

21. The light source assembly of claim 1, further comprising:
an outer frame, fixed onto the fixing base, wherein the adjusting plate has a first surface and a second surface opposite to each other, the first surface faces towards the bottom of the fixing base, and the second surface faces towards the lens plate, and wherein the outer frame is located partially on the second surface of the adjusting plate such that the lens plate fixed onto the adjusting plate is uncovered.

22. The light source assembly of claim 21, wherein the outer frame has a front opening, and at least one pressing portion is located along a periphery of the front opening and extends inwards, and wherein the at least one pressing portion of the outer frame is located on the second surface of the adjusting plate and presses the adjusting plate.

23. The light source assembly of claim 1, wherein the adjusting plate comprises at least one lateral plate side perpendicular to the first direction, the adjusting frame comprises at least one lateral internal surface perpendicular to the first direction, and the at least one lateral plate side abuts against the at least one lateral internal surface.

24. The light source assembly of claim 1, the lens plate is fixed onto the adjusting plate by using at least one plate spring.

25. A projection apparatus, comprising:
a light source assembly, providing an illumination beam, wherein the light source assembly comprises:
  a substrate, comprising a plurality of light-emitting units;
  a fixing base, fixed onto the substrate and comprising a bottom and at least one wall, wherein a recess is formed at least by the bottom and the at least one wall;
  an adjusting frame, movably disposed in the recess and having an opening;
  an adjusting plate, movably disposed in the opening of the adjusting frame; and
  a lens plate, fixed onto the adjusting plate and comprising a plurality of lenses,
  wherein a plurality of first through-holes are formed in the bottom of the fixing base and a plurality of second through-holes are formed in the adjusting plate such that the plurality of light-emitting units are exposed from the adjusting plate;
a light engine assembly, provided for converting the illumination beam into an image beam; and
a projection lens assembly, provided for projecting the image beam onto a projection object.

* * * * *